April 29, 1952
P. T. PARKER
2,595,096
SYNTHESIS OF ALCOHOL FROM OLEFINS, CARBON
MONOXIDE AND HYDROGEN
Filed May 20, 1948
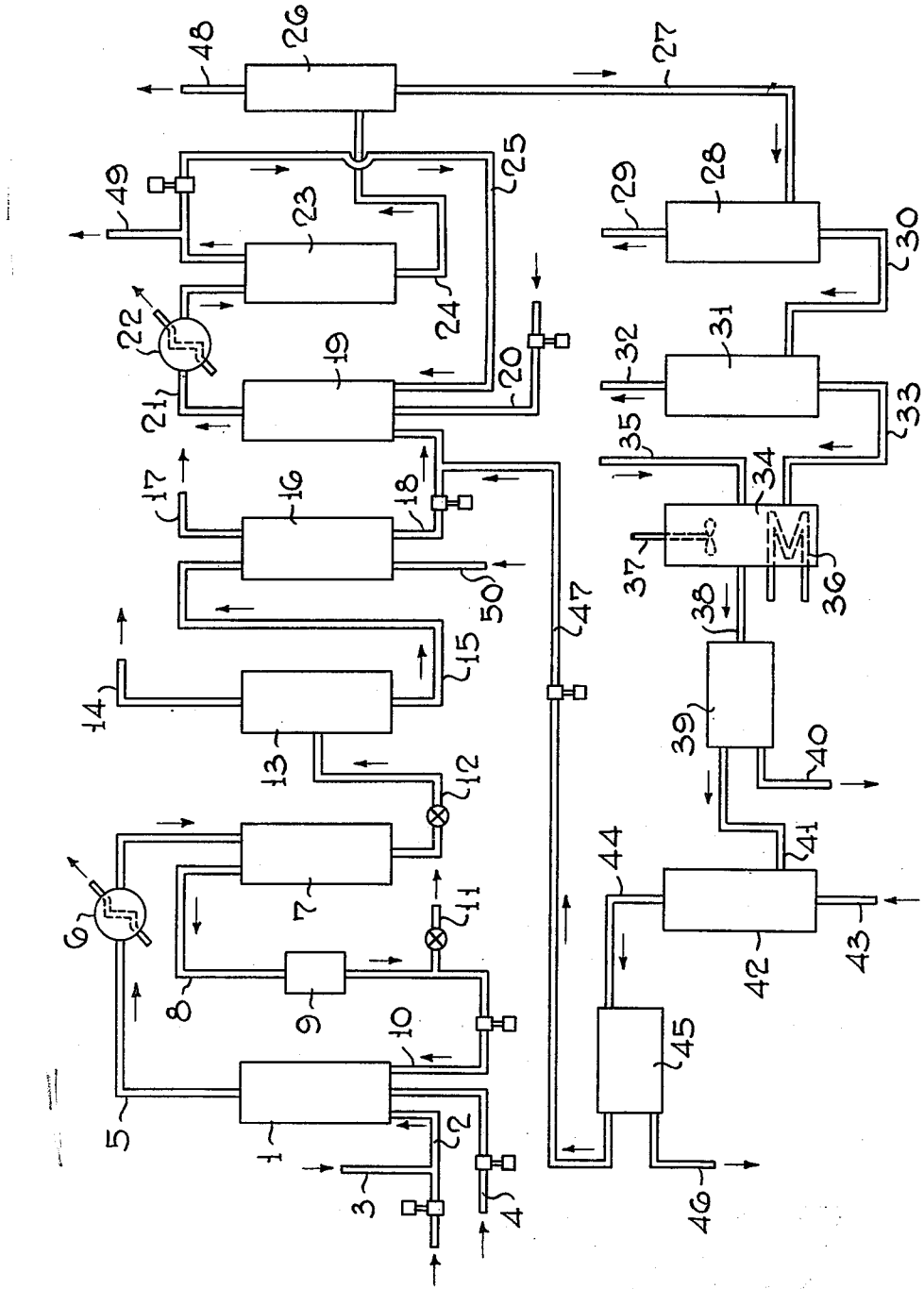
Paul T. Parker Inventor
By J. Cushman Attorney Patented Apr. 29, 1952

2,595,096

UNITED STATES PATENT OFFICE 2,595,096

SYNTHESIS OF ALCOHOL FROM OLEFINS, CARBON MONOXIDE, AND HYDROGEN

Paul T. Parker, Baton Rouge, La., assignor to Standard Oil Development Company, a corporation of Delaware Application May 20, 1948, Serial No. 28,256

5 Claims. (Cl. 260—638)

The present invention relates to the production of oxygenated organic compounds by the catalytic reaction of olefins with hydrogen and carbon monoxide. More specifically the present invention presents a process for increasing the yield of alcohol that may be obtained at the expense of undesirable secondary reaction products resulting from this process.

It is now well known in the art that oxygenated organic compounds may be synthesized from olefins by reaction of the latter with carbon monoxide and hydrogen in the presence of catalyst containing cobalt or iron in a two stage process. In the first stage, the olefinic material, the catalyst, and proper proportions of CO and $H_2$ are reacted to give a product which consists predominantly of aldehydes, and this material is hydrogenated in the second stage to give the corresponding primary alcohols. The over-all reaction consists essentially of an addition of $H_2$ and CO to the unsaturated linkage and may be formulated as follows:

Stage 1.
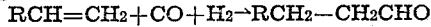
Stage 2.
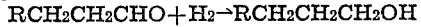

It is thus seen that both the aldehyde and the alcohol formed as a result of the reaction contain one more carbon atom than the olefinic material from which they are derived.

The carbonylation reaction provides a particularly effective method for preparing valuable primary alcohols, which find large markets particularly as intermediates for detergents and plasticizers. The carbonylation, or "Oxo" process, as it is sometimes called, may be used effectively with long and short chain olefinic compounds, depending on the type alcohol desired. Thus straight and branch chained olefins and diolefins such as propylene, butylene, butadiene, pentene, pentadiene, hexene, heptene, olefin polymers such as di- and tri-isobutylene, hexene and heptene dimers, polypropylenes, and olefinic fractions from the hydrocarbon synthesis process, thermal or catalytic cracking operations, and other sources of hydrocarbon fractions containing such olefins may be used as starting material, depending on the nature of the final product desired. In general, olefins having up to about 18-20 carbon atoms in the molecule are preferred in this reaction.

The catalysts for the first stage of the process are usually employed in the form of salts of the catalytically active metals with high molecular weight fatty acids such as stearic, palmitic, oleic, naphthenic and similar acids. Thus, as suitable catalysts are such organic salts as cobalt stearate, oleate, or naphthenate or iron linoleate. These salts are soluble in the liquid olefin feed and may be supplied to the first reaction zone as hydrocarbon solutions or preferably, dissolved in the olefin feed.

The synthesis gas mixture feed to the first stage may consist of any ratio of $H_2$ to CO, but preferably these two gases are present at about 1.0 volume hydrogen per volume CO. The conditions for olefins reacting with $H_2$ and CO vary somewhat in accordance with the nature of the olefin feed, but the reaction is generally conducted at pressures in the range of about 1500 to 4500 p. s. i. g. and at temperatures in the range of about 150° to 450° F.

The quantity of $H_2+CO$ with respect to olefins used may vary within wide ranges, for example, from 1000 to 45,000 cu. ft. of $H_2+CO$ per barrel of olefin fed. In general, about 2,500 to 15,000 cu. ft. of $H_2+CO$ per barrel of olefin fed are employed.

At the end of the first stage, the reaction product and unreacted materials are generally transferred directly to a hydrogenation vessel, where the aldehydes are hydrogenated to alcohols. As hydrogenation catalyst may be employed such materials as supported or unsupported metallic nickel, cobalt, sulfactive catalysts as tungsten, molybdenum and nickel sulfides, alone or in combination, copper chromite, or other carbonyl group-reducing catalysts. In the hydrogenation step, the temperatures are generally between the range of 150°-450° F. and the pressures within the range of about 1500-4500 p. s. i. g.

The final stages of the process involve the separation of the hydrogenated material from the non-hydrogenated residue, and it is to these stages that the present invention applies. As it is performed generally in the art, the aldehydes are hydrogenated under the conditions referred to above, then the crude hydrogenation product is first subjected to a distillation process to distill unreacted hydrocarbons boiling below the alcohol range, and the bottoms from this distillation, comprising the alcohol fraction, is subject to a second distillation stage, where the alcohols are taken overhead. The bottoms from this alcohol distillation have in the past, been considered to be a mixture of polymeric material, such as polymerized aldehydes and ketones, high molecular weight ethers and secondary alcohols and polymerized hydrocarbons, and such bottoms were considered to be of only secondary value as fuel. These bottoms had the effect of cutting down substantially the yield and the alcohol selectivity of the process and increasing the difficulty of separating the alcohols from these bottoms.

It is the principal object of the present invention to provide a process whereby the over-all yield and selectivity of alcohols from the carbonylation reaction is substantially increased. It is also the object of the present invention to decrease the quantity of by-products from this reaction, which only are of secondary value as fuel.

The present invention is based on the discovery that the bottoms from the alcohol distillation process comprise a substantial portion, up to 50% by volume, of acetals. Though it is known that acetals are formed by the interaction of aldehydes and alcohols, a mineral acid catalyst is considered necessary to form these compounds, in accordance with the equation:

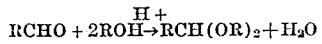

These compounds are very stable to heat, and boil substantially above the aldehydes and alcohols from which they are formed. Anhydrous alcohols, on the other hand, react directly with aldehydes to form exothermic addition compounds, hemi-acetals, which are fairly unstable, and on heating break down to the corresponding alcohol and aldehyde. Since the carbonylation reaction involves no step in which mineral acids are added or formed, the presence of acetals in the final crude product has not hitherto been suspected.

In accordance with the invention, the bottoms from the alcohol distillation step are treated with dilute mineral acid or with steam at elevated temperatures or by other catalytic means, thereby causing the regeneration of substantial quantities of valuable alcohols and aldehydes. The hydrolyzed products may then be separated from the non-hydrolyzed material by vacuum or by steam distillation and the alcohols and aldehydes thus separated may advantageously be recycled to the hydrogenation stage. Thus by converting 50% of these bottoms to alcohols, the over-all yield may be increased by about 10% and the over-all selectivity by about 15%.

The present invention will be best understood from the more detailed description hereinafter, wherein reference will be made to the accompanying drawing, which is a schematic illustration of a system suitable for carrying out a preferred embodiment of the invention.

Referring now to the drawing, an olefinic hydrocarbon having one carbon atom less than the number of carbon atoms in the desired resulting oxygenated compound and containing dissolved a catalyst promoting the reaction of olefinic compounds with carbon monoxide and hydrogen to form oxygenated organic compounds is fed to the lower portion of primary reactor 1 through feed line 2. Any conventional type catalyst such as cobalt stearate, naphthenate, oleate, iron linoleate, etc. may be used. Catalyst make-up dissolved in olefin feed may be added to the main olefin feed line 2 through line 3. The concentrations of catalyst and the proportions of the catalyst-containing feed to the non-catalyst containing feed are such that the concentration of catalyst in the total olefin feed varies between 0.1 to 5.0% by weight, preferably about 1% by weight of catalyst salt to olefin.

Simultaneously, a gas mixture containing hydrogen and carbon monoxide in the approximate ratio of 0.5 to 2.0 volumes of hydrogen per volume of carbon monoxide is supplied through line 4 and is fed to primary reactor 1 along with the olefin to be reacted. Reactor 1 is preferably operated at about 3000 p. s. i. g. and at a temperature of from about 250° to 400° F. The reactor may contain no packing, or may be packed with catalytically inert solid material, such as ceramic Raschig rings, pumice, and the like.

Liquid oxygenated reaction products, unreacted olefins, and synthesis gases are withdrawn from the top of the high pressure reactor 1 and are transferred through line 5 and cooler 6 to high pressure separator 7 where unreacted gases are withdrawn overhead through line 8, scrubbed in scrubber 9 of entrained metal carbonyl catalyst and may be recycled through line 10 to Oxo reactor 1 or used as required in other parts of the system.

Liquid products are withdrawn through line 12 from high pressure separator 7 to low pressure separator 13 where more dissolved metal carbonyl and gases are removed overhead through line 14. From the bottom of low pressure separator 13 the liquid products and unreacted olefins are passed through line 15 to catalyst removal zone 16 which may be a vessel packed with inert solid material of a nature similar to that in primary reactor 1 or may also contain no packing. Hydrogen-comprising gases recovered from another stage of the process may be supplied to catalyst removal zone 16 through line 50 and passed through zone 16 countercurrently to the liquid oxygenated product. Catalyst removal zone 16 is preferably maintained at a temperature of about 200° to 450° F., at which temperature the catalyst which enters zone 16 predominantly in the form of metal carbonyl, such as cobalt carbonyl, dissolved in the liquid product is decomposed into metal and carbon monoxide. The metal may be deposited on the inert packing within zone 16 or on the walls, while the carbon monoxide may be purged by the hydrogen. A mixture of hydrogen and carbon monoxide may be withdrawn through line 17 and sent to a methanizer or other suitable catalytic unit, wherein carbon monoxide may be converted into methane in any conventional manner, or the purge gas mixture may be used directly in hydrogenator 19 if a CO-insensitive hydrogenation catalyst such as the sulfactive catalysts such as sulfides of molybdenum, tungsten, etc. is employed as hydrogenation catalyst.

Liquid oxygenated products now substantially free of carbonylation catalysts are withdrawn from catalyst removal zone 16 through line 18 and passed to the lower portion of hydrogenation reactor 19. Simultaneously, hydrogen is supplied to reactor 19 through line 20 in proportions sufficient to convert the organic carbonyl compounds in the oxygenated feed into the corresponding alcohols. Hydrogenator 19 may contain a mass of any conventional hydrogenation catalyst, for example, nickel, copper chromite, sulfactive hydrogenation catalysts such as tungsten sulfide, nickel sulfide, molybdenum sulfide, and the like. Depending upon the catalyst, reactor 19 may be operated at pressures ranging from 2500 to 4500 p. s. i. g. and at temperatures of from about 300° to 500° F. and an $H_2$ rate of from about 5000 to 20,000 normal cu. ft. per bbl.

of feed. The catalyst may be in the form of fixed or moving beds, or suspended in the liquid feed.

The products of the hydrogenation reaction and unreacted hydrogen may be withdrawn overhead through line 21 from reactor 19 then through cooler 22 into high pressure separator 23. Unreacted hydrogen may be withdrawn overhead from separator 23 through line 25 and either vented through line 49 or preferably recycled through line 25 to hydrogenation reactor 19. The liquid products are withdrawn from separator 23 through line 24 into low pressure separator 26 where more dissolved gas is flashed overhead through line 48 and liquid products are withdrawn from a lower portion and passed through line 27 to hydrocarbon still 28, wherein are distilled overhead low-boiling products, mostly hydrocarbons boiling below the alcohol product desired. Thus when a C7 U. O. P. olefin fraction is the feed to the process, generally the product boiling up to 340° F. is removed as a heads cut in hydrocarbon still 28, and this material is withdrawn overhead through line 29 and may be used as a gasoline blending agent if desired. The bottoms from this primary distillation are withdrawn from hydrocarbon still 28 through line 30 and sent to alcohol still 31, where the product alcohols boiling in the desired range may be removed overhead by distillation at atmospheric pressures or under partial vacuum, depending upon the molecular weight of the alcohols.

The bottoms from the alcohol still 31 are withdrawn through line 33 and passed into hydrolyzer 34. This latter may be any conventional type of hydrolysis vessel equipped with closed or open steam coils 36 and preferably with a means of agitation, as agitator 37. Vessel, coil and agitator are preferably constructed of acid resistant material. A 10% aqueous solution of HCl is admitted through line 35 and the agitated mixture of acid and alcohol distillation bottoms is maintained at a temperature of about 200° to 250° F. until the acetals present are substantially completely hydrolyzed. The mixture is then withdrawn through line 38 to settler 39, where the bottom aqueous acid layer is withdrawn after settling, through line 40, and either discarded or recycled to the hydrolyzer. The upper layer, comprising alcohols, aldehydes, and unhydrolyzable products is withdrawn through line 41 and conveyed to steam distillation still 42. Here live steam is introduced through line 43 and the readily steam-distillable alcohols and aldehydes are separated from the less volatile polymeric material remaining in still 42. The steam-distilled alcohols and aldehydes are passed overhead to receiver 45, where the condensed steam lower layer which forms may be withdrawn through line 46. The upper layer in receiver 45 comprising the bulk of the aldehydes and alcohols resulting from the hydrolysis of the alcohol bottoms may be recycled through line 47 to hydrogenator 19 for further reduction of the aldehydes to alcohols.

The system illustrated in the drawing and in the foregoing description permits various modifications. Thus it may be desirable, and even preferable, to carry out the hydrolysis of the acetals in the alcohol bottoms with steam instead of dilute acid, thus saving on acid resistant equipment and also thus inhibiting any tendencies of the aldehydes formed to produce aldol-type condensation products. For this purpose, hydrolyzer 34 may be a pressure vessel and the live steam furnished through the open coil may be at a temperature of from about 300° to about 400° F.

Also should the olefin feed be of a molecular weight low enough so that the resulting alcohols are water-soluble, the water layer from hydrolyzer 34 instead of being discarded may be concentrated in a manner known per se and the alcohols recovered directly without being recycled to the hydrogenator 19.

Instead of steam distilling the products of hydrolysis, the alcohols and aldehydes may be separated from the non-hydrolyzable material in the alcohol bottoms by vacuum distillation preferably at 30 mm. Hg or less, and the distillation product may then be hydrogenated or may be treated with an aldehyde polymerizing agent such as alkali or alkaline earth bases, and the alcohol may be readily distilled from the product. This alkali treatment has a further advantage of hydrolyzing any esters that may have been formed as a result of the Oxo reaction and subsequent hydrogenation.

Other catalytic agents beside dilute mineral acids which may be used to convert the acetals in the alcohol bottoms to aldehydes and alcohols comprise alumina, silica and metals or metal oxides of the eighth group of the periodic system.

The invention may be further illustrated by the following examples, in which the acetals present in the bottoms from the distillation of the Oxo hydrogenation products were hydrolyzed in accordance with the invention.

EXAMPLE I

*First stage—Aldehyde synthesis*

| | |
|---|---|
| Feed | C7 cut (160–210° F.) UOP polymer |
| Catalyst | Cobalt oleate |
| Wt. per cent catalyst on feed | 1.2 |
| Temperature ° F. avg | 349 |
| Pressure, p. s. i. g | 3000 |
| Liquid feed rate, v./v./hr | 0.99 |
| H2+CO feed rate, SCF/B [1] | 3000 |
| H2/CO ratio, volume | 1.14 |
| Olefin conversion per cent | 77 |

*Second stage—Hydrogenation of aldehydes to alcohols*

| | |
|---|---|
| Catalyst | Nickel and tungsten sulfides |
| Catalyst temperature ° F. avg | 410 |
| Liquid feed rate, v./v./hr | 1.0 |
| Hydrogen pressure p. s. i. g | 2700 |
| Hydrogen rate CF/B | 5000 |
| Distillation summary: | |
|   Weight per cent hydrocarbon+ unreacted (init. 340° F.) | 24 |
|   Weight per cent alcohols (340–370° F.) | 61 |
|   Weight per cent bottoms (370° F. up) | 15 |
| Alcohol selectivity per cent | 74 |

[1] Standard cubic feet per barrel.

A 500 cc. sample of the high boiling bottoms (370° F. up) produced as above, was treated in an autoclave with an equal volume of water at 350° F. for two hours. The increase in alcohol content is indicated by the change in hydroxyl number of the product as compared with the bottoms before treatment.

Alcohol bottoms inspection

|  | Before Hydrolysis | After Hydrolysis | After Acid Hydrolysis [2] |
|---|---|---|---|
| Hydroxyl No. mg.KOH/g. | 30 | 78 | 77 |
| Carbonyl No. | 35 | 58 | 67 |
| Saponification No. | 40 | 46 |  |
| Acid No. | 1.8 | 1.3 |  |
| Percent Actual Alcohol Increase (on bottoms) |  | 11.1 | 10.9 |
| Percent Potential Alcohol Increase (on bottoms)[1] |  | 16.4 | 18.2 |
| Percent Increase on over-all alcohol selectivity (actual) |  | 2.2 | 2.2 |
| Percent Increase on over-all alcohol selectivity (potential)[1] |  | 3.3 | 3.7 |

[1] Based on reduction to alcohols of aldehydes formed on acetal hydrolysis.
[2] Sample of bottoms refluxed with 5% H₂SO₄ for two hours.

Thus by conversion of 15% of the bottoms to alcohols the total yield may be increased by 2-3% and the over-all selectivity by about 3-4%, an important increase on commercial operation.

EXAMPLE II

The presence of acetals in the high-boiling fraction (370° F. up) was further confirmed in a second experiment in which a sample of the high-boiling material produced under the same conditions as described in Example I was redistilled to remove any residual $C_8$ alcohols, and the bottoms of this second distillation step were redistilled at 10 mm. and the fraction boiling in the range of 270°-292° F., comprising about 93% of the material, was hydrolyzed with water alone and with 10% HCl.

Alcohol bottoms inspection

|  | Before Hydrolysis | After Hydrolysis [1] | After Acid Hydrolysis [2] | After Hydrogenation [3] |
|---|---|---|---|---|
| Sample: 270°-285°F./10mm.— |  |  |  |  |
| Hydroxyl No. |  | 138 |  |  |
| Carbonyl No. |  | 106 |  |  |
| Sample: 285°-292°F./10mm.— |  |  |  |  |
| Hydroxyl No. | 15 |  | 83 | 291 |
| Carbonyl No. | 15 |  | 120 | 0 |

[1] Hydrolysis with steam at 350° F.
[2] Hydrolysis with 10% HCl at 220° F.
[3] Hydrogenation over nickel catalyst at 350°F. and 2700 p. s. i. g. $H_2$ for 12 hours. This product after hydrogenation yielded 75% (vol.) of $C_8$ alcohols.

It can readily be seen from the above that distillation of the final hydrogenated alcohol synthesis product may yield as much as 20% high boiling bottoms, of which about 30-50% boil in the acetal boiling range, 270-300° F., at 10 mm. pressure. Conversion of these acetals to the corresponding alcohols will thus increase the yield by about 10% and the over-all selectivity by about 15%.

While the foregoing description and exemplary operation has served to illustrate specific applications of the invention, only such limitations should be imposed on the invention as are indicated in the appended claims.

What is claimed is:

1. In a carbonylation process wherein olefins, carbon monoxide and hydrogen are contacted with a cobalt catalyst and under conditions including pressures below 4500 p. s. i. g. to produce oxygenated reaction products comprising organic carbonyl compounds and in which said organic carbonyl compounds are reduced to alcohols in a hydrogenation zone and the alcohols subsequently distilled, the improvement which comprises increasing the overall yield of alcohol by subjecting the residue from the alcohol distillation process to a hydrolysis reaction in a neutral medium at temperatures above about 300° F. and hydrogenating at least a portion of the products of hydrolysis.

2. An improved process for the production of alcohols from olefins, carbon monoxide and hydrogen which comprises contacting olefins, carbon monoxide and hydrogen with a cobalt catalyst under conditions including pressures of less than about 4500 p. s. i. g. to produce oxygenated reaction products comprising organic carbonyl compounds in a reaction zone, passing said oxygenated reaction products to a hydrogenation zone, subjecting said products to a hydrogenation reaction under hydrogenation conditions to produce substantial quantities of alcohol, withdrawing hydrogenated and non-hydrogenated organic products from said hydrogenation zone, subjecting said products to an alcohol distillation process in an alcohol distillation zone, withdrawing overhead a product comprising substantially alcohols containing one more carbon atom than the olefin fed to the carbonylation zone, withdrawing distillation bottoms from said reaction zone comprising acetals, subjecting said distillation bottoms to a hydrolysis reaction in a neutral medium in a hydrolysis zone whereby at least a portion of said distillation bottoms are hydrolyzed, maintaining a hydrolysis temperature above about 300° F., withdrawing aldehydes and alcohols from said hydrolysis zone and recycling at least a portion of said alcohols and aldehydes to said hydrogenation zone.

3. The process of claim 1 in which at least a portion of said hydrolysis products is recycled to said hydrogenation zone.

4. The process of claim 2 in which said olefin comprises olefins containing from 2 to 20 carbon atoms in the molecule.

5. The process of claim 1 in which hydrolysis products are removed from non-hydrolyzed material by a process of vacuum distillation.

PAUL T. PARKER.

REFERENCES CITED

The following references are of record in the file of this patent:

UNITED STATES PATENTS

| Number | Name | Date |
|---|---|---|
| 2,415,102 | Landgraf et al. | Feb. 4, 1947 |
| 2,437,600 | Gresham et al. | Mar. 9, 1948 |

OTHER REFERENCES

Fieser and Fieser, "Organic Chemistry," page 221, published by Heath & Co., Boston, Mass., 1944.